US009788056B2

(12) United States Patent
Vijay et al.

(10) Patent No.: US 9,788,056 B2
(45) Date of Patent: Oct. 10, 2017

(54) SYSTEM AND METHODS FOR STIMULATING SENSES OF USERS OF A MEDIA GUIDANCE APPLICATION

(71) Applicant: Rovi Guides, Inc., Santa Clara, CA (US)

(72) Inventors: Shyam Sunder Vijay, Fremont, CA (US); Walter R. Klappert, Los Angeles, CA (US)

(73) Assignee: Rovi Guides, Inc., San Carlos, CA (US)

( * ) Notice: Subject to any disclaimer, the term of this patent is extended or adjusted under 35 U.S.C. 154(b) by 76 days.

(21) Appl. No.: 14/752,148

(22) Filed: Jun. 26, 2015

(65) Prior Publication Data
US 2016/0381415 A1 Dec. 29, 2016

(51) Int. Cl.
| | |
|---|---|
| *H04N 7/16* | (2011.01) |
| *H04N 21/442* | (2011.01) |
| *H04N 21/422* | (2011.01) |
| *H04N 21/258* | (2011.01) |
| *H04N 21/45* | (2011.01) |
| *G06F 3/01* | (2006.01) |
| *H04N 21/4415* | (2011.01) |

(52) U.S. Cl.
CPC ....... *H04N 21/44218* (2013.01); *G06F 3/011* (2013.01); *G06F 3/016* (2013.01); *H04N 21/25883* (2013.01); *H04N 21/42201* (2013.01); *H04N 21/4415* (2013.01); *H04N 21/4532* (2013.01)

(58) Field of Classification Search
CPC ......... H04N 21/4415; H04N 21/42201; H04N 21/44218
USPC ....................................... 725/10, 14
See application file for complete search history.

(56) References Cited

U.S. PATENT DOCUMENTS

| | | | |
|---|---|---|---|
| 6,239,794 B1 | 5/2001 | Yuen et al. |
| 6,388,714 B1 | 5/2002 | Schein et al. |
| 6,564,378 B1 | 5/2003 | Satterfield et al. |
| 6,756,997 B1 | 6/2004 | Ward, III et al. |
| 7,165,098 B1 | 1/2007 | Boyer et al. |
| 7,761,892 B2 | 7/2010 | Ellis et al. |
| 8,046,801 B2 | 10/2011 | Ellis et al. |
| 8,308,572 B2 | 11/2012 | Mckenna et al. |
| 8,898,091 B2 | 11/2014 | Frank et al. |
| 2002/0174430 A1 | 11/2002 | Ellis et al. |
| 2003/0110499 A1 | 6/2003 | Knudson et al. |
| 2005/0251827 A1 | 11/2005 | Ellis et al. |
| 2008/0317292 A1 | 12/2008 | Baker et al. |
| 2010/0153885 A1 | 6/2010 | Yates |
| 2012/0289312 A1 | 11/2012 | Hamlin et al. |
| 2013/0280682 A1 | 10/2013 | Levine et al. |

(Continued)

*Primary Examiner* — Pankaj Kumar
*Assistant Examiner* — Franklin Andramuno
(74) *Attorney, Agent, or Firm* — Haley Guiliano LLP

(57) ABSTRACT

Methods and systems for a media guidance application that may stimulate the senses of users. The media guidance application may determine a preferred biometric state associated with a media asset, determine a current biometric measurement of a user, cross-reference the preferred biometric state in a database to determine a difference in sensory stimulation between the current biometric state of the user and the preferred biometric state, and cause the user to be stimulated to account for the difference.

20 Claims, 5 Drawing Sheets

(56) References Cited

U.S. PATENT DOCUMENTS

| | | | |
|---|---|---|---|
| 2013/0283162 A1* | 10/2013 | Aronsson | G11B 27/105 |
| | | | 715/719 |
| 2014/0287387 A1* | 9/2014 | Vukasinovic | G09B 7/02 |
| | | | 434/236 |
| 2014/0347265 A1 | 11/2014 | Aimone et al. | |
| 2015/0033262 A1 | 1/2015 | Klappert et al. | |
| 2016/0220194 A1* | 8/2016 | Kang | A61B 5/7278 |

* cited by examiner

SYSTEM AND METHODS FOR STIMULATING SENSES OF USERS OF A MEDIA GUIDANCE APPLICATION

BACKGROUND

With the development of enhanced home media systems such as 3D and 4D entertainment systems, media content generated for display may include not only sights and sounds but also touch (through vibrations or motions of a chair), scent, and taste. However, with conventional enhanced home media systems, users may be unable to control the intensity level of these various stimuli, which may be predetermined by media providers. Users of certain age groups, or having certain medical conditions, may find that they cannot watch enhanced media content because the set intensity levels of the stimuli are uncomfortable, or may even present health risks (e.g., heart attack, epilepsy, etc.). Alternatively, users of certain age groups or with certain health conditions (e.g., reduced hearing) may find that they are unable to enjoy the full sensory experience associated with media assets because the levels of stimulation set by the provider are too low to be effective for them. Likewise, media providers are unable to tailor the sensory experiences to particular users or health conditions of those users.

SUMMARY

Accordingly, methods and systems are disclosed herein for a media guidance application that solves the aforementioned problems by tailoring sensory stimulation to particular users. For example, while media content providers may not be able to provide instructions for sensory stimulation that are tailored to each user that may consume the media content, the media guidance application may use the general instructions for sensory stimulation provided by the media content providers and tailor those instructions to a particular user. Advantageously, the media guidance application relieves media content providers of the burden of trying to tailor sensory stimulation to a particular user as well as ensuring that the level of stimulation received by the user adequately enhances the sensory experience of the user without adversely affecting the health of the user.

To do so, the media guidance application may determine the intensity of sensory stimulation, as previously determined by media providers, associated with media assets. The media guidance application may then adjust the intensity of sensory stimulation applied based on the characteristics of the user (e.g., age, health conditions, or any other preferences and biometric information).

In some aspects, the media guidance application may determine a preferred biometric state associated with a media asset. For example, a version of Jurassic Park may be associated with an overall preferred biometric state of "fear." Alternatively, the version of Jurassic Park may be associated with different biometric states, each corresponding to different passages. For example, a passage where the T-Rex is approaching may be associated with a biometric state of extreme fear, and other passages when humans bond with some dinosaurs, or escape the island, may be associated with biometric states of happiness and relief.

The media guidance application may then cross-reference the preferred biometric state defined by the media provider in a database listing biometric measurements of the user that correspond to preferred biometric states to determine a biometric measurement of the user that corresponds to the preferred biometric state. For example, a first user, John, may experience a significantly elevated heart rate, a significantly increased rate of pupil dilation, and a significantly raised body temperature when experiencing a biometric state of "fear." For example, the database may indicate that when John is scared, i.e., experiencing "fear," the body temperature of John is 99 degrees Fahrenheit. In another example, a second user, Lisa, may display no variation in rate of pupil dilation, but a significantly elevated heart rate when experiencing "excitement." For example, the database may indicate that when Lisa is "excited," i.e., experiencing excitement, the heart rate for Lisa is 110 beats per minute.

The media guidance application may then determine a current biometric measurement (e.g., a heart rate, temperature, blood pressure, pupil dilation, etc.) of the user. For example, the media guidance application may receive information from sensors embedded in an armchair in which a user sits that indicates various biometric measurements. For example, the media guidance application may determine that the current body temperature of John is 98 degrees Fahrenheit.

The media guidance application may then determine a difference in sensory stimulation between the current biometric measurement of the user and the biometric measurement of the user that corresponds to the preferred biometric state. For example, when the preferred biometric state of "fear" is reached, the database may indicate that the body temperature of John is typically 99 degrees Fahrenheit. The media guidance application may determine that the current body temperature of John is 98 degrees Fahrenheit. Thus, the media guidance application may determine that there is a one degree Fahrenheit difference in sensory stimulation between the current biometric measurement of the user and the biometric measurement of the user that corresponds to the preferred biometric state.

Finally, the media guidance application may cause the user to be stimulated to account for the difference in sensory stimulation between the current biometric measurement of the user and the biometric measurement of the user that corresponds to the preferred biometric state. For example, the media guidance application may stimulate the user to account for the difference in biometric measurements. For example, if the media guidance application determines that the difference corresponds to one degree Fahrenheit more, the media guidance application may stimulate the user until the body temperature of the user is raised by one degree Fahrenheit. The media guidance application may account for the difference by adjusting a frequency or intensity of sensory stimuli (a sound impact level, a touch impact level, a smell impact level, or a sight impact level, etc.) provided by a user device. For example, some but not all of the sensory stimuli may be increased in frequency or intensity (e.g., emitted scents, vibrations, etc., may become more pronounced).

In some embodiments, the biometric state is a qualitative description of a physiological or psychological state. For example, the biometric state may be "fear," "happiness," "anger," or "stress." Alternatively or additionally, the biometric state may be a quantitative description of a physiological state of the user. For example, a biometric state can be a combination of quantitative biometric measurements such as heart rate, pupil dilation, body temperature, etc.

In some embodiments, the media guidance application may prompt the user before stimulating the user to account for the difference. For example, when a difference in sensory stimulation between a user's current biometric measurement and the biometric measurement of the user that corresponds to the preferred biometric state is detected by the media guidance application, the media guidance application may pause the display of the media asset and generate for display a message, such as "Would you like to adjust the sensory effects levels for this movie?" The media guidance application may generate for display first and second selectable options "Yes" and "No," and implement the action corresponding to the selectable option selected by the user. Alternatively, the media guidance application may implement a default option (e.g., generating for display the asset with sensory effects) when the user fails to respond within a certain time period (e.g., 30 seconds).

In some embodiments, the media guidance application may also set limits on the amount of sensory stimulation (e.g., in order to prevent adverse health conditions). To do so, the media guidance application may determine a threshold amount of sensory stimulation for the user, and compare the threshold amount of sensory stimulation for the user to the difference. The media guide application then stimulates the user to account for the difference based on the difference within the limit set by the threshold amount of sensory stimulation for the user. For example, for Jenna, who has a hearth arrhythmia, a threshold amount of sensory stimulation may be any stimulation that results in a heart rate of above 80. Thus, if the media guidance application determines that the heart rate of Jenna is 81, the media guidance application may stop stimulating Jenna irrespective of the sensory stimulation instructions associated with the media asset.

In some embodiments, the media guidance application may store information of a user for use in determining biometric measurements of the user that correspond to preferred biometric states. For example, the media guidance application may populate the database listing biometric measurements of the user based on user responses to a biometric calibration. For example, when a user first uses a user device such as a headset or armchair, the media guidance application may acquire biometric measurements for the user and may prompt the user for feedback. For example, the media guidance application may prompt the user to enter his overall mood after generating for display a short preview associated with predetermined scent, sound, touch, and sight impact levels.

It should be noted that the systems, methods, apparatuses, and/or aspects described above may be applied to, or used in accordance with, other systems, methods, apparatuses, and/or aspects.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION OF DRAWINGS

Figure 1:
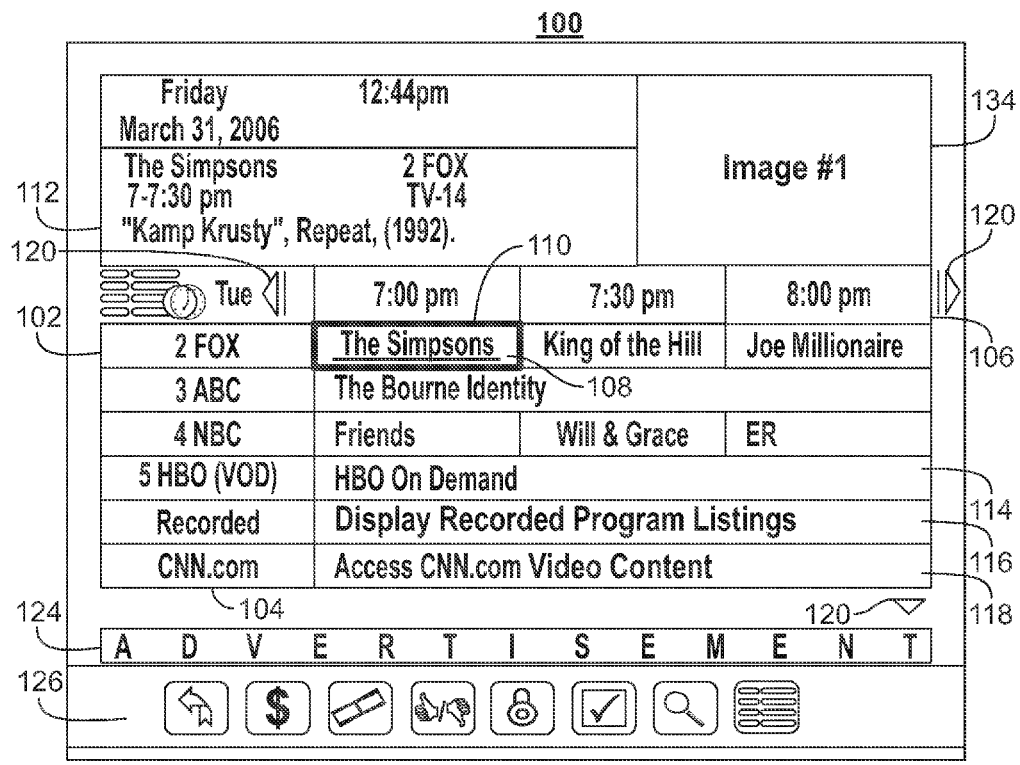
FIG. 1 shows an illustrative media guidance application for selecting media assets in accordance with some embodiments of the disclosure.

Methods and systems are disclosed herein for stimulating senses of users of a media guidance application. In any given content delivery system, content may be available to users in a standard 2D format, or in a '4D' format with preset sensory effects. Consequently, many users desire an application that customizes the sensory effects associated with media content generated for display to improve their entertainment experience. An application that provides such customization is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content.

It should be noted that any embodiment herein implemented using a media guidance application with a user interface may also be applicable to a media guidance application that does not include a user interface. For example, a media guidance application may be implemented on a user device without presenting a separate user interface from the user interface associated with the user device. For example, an amusement park ride or attraction may include a media guidance application, in communication with a user device such as a ride element (e.g., armchair in a 4D theater). For example, the media guidance application may during the course of a ride, receive information from the user device, generate for display a media asset, and adapt the ride experience (e.g., level of movement of the ride, noise level associated with the media asset, and/or other sensory effects), based on this received information.

As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices which they traditionally did not use. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

In some embodiments, a media guidance application may use a user device to stimulate a user and/or determine biometric measurements of a user. For example, a media guide application may generate for display media content in a '4D' format. As referred to herein, "4D capabilities" or "4D format" refers to any enhanced format, i.e., a format with display capabilities beyond 2D video and audio. For example, a media guidance application functioning in "4D" format may generate for display 3D video, may instruct a user device to move (motion), and may request smell generation (scent), etc. In one example, a media guide application with '4D' capabilities enabled may be used in conjunction with a user device, such as an armchair or recliner, a headset or helmet, which can be paired with the user's media guidance system to allow a user to experience media in '4D' mode. A media guidance application may connect to a user device, and once paired with the user device, may configure the user device to receive and send signals. The user device may include sensors to receive and process data from the user, and to transmit information about the user to the media guidance system such that the media guidance system can send instructions to the user device to adjust the intensity of sensory stimuli applied to the user. For example, an armchair may include sensors for measuring heart rate and/or brainwaves, and may transmit the user's heart rate and brainwave activity to the media guidance system. Sensors may be operable to measure at least two biometric parameters selected from a group consisting of galvanic skin response, heart response, motion, skin temperature, breathing, EEG, EMG, pupil dilation, eye tracking, facial recognition, and combinations thereof. Different types of sensors and different types of biometric data that may be acquired are described in further detail at least in Levine et al. (U.S. Patent Application Publication No. 2013/0280682), hereby incorporated by reference herein in its entirety.

Operation of a wearable device and use of various types of bio-signals, including brainwaves, to control the device is described in more detail in Aimone et al. (U.S. Patent Application Publication No. 2014/0347265), hereby incorporated by reference herein in its entirety.

The media guidance application may receive biometric data from a user device in order to monitor the biometric state of the user. The media guidance application may use the monitored data to determine a biometric state of the user. For example, the media guidance application may determine based on a user's heart rate and brainwave activity, or any other combination of biometric data, that the user is distressed by a war movie currently being displayed (e.g., War Horse).

The media guidance application may prompt a user device to pair with the entertainment system. The media guidance application may also configure the user device to send and receive signals to/from the media guidance application. The media guidance application may receive and process data sent from a user device and sensors associated with the user device. Finally, the media guidance application may transmit instructions to the user device to adjust the intensity of sensory stimuli applied to the user. For example, a media guidance application may communicate with a user device, e.g., an armchair, which may include sensors for measuring heart rate and/or brainwaves, and may request and receive the user's heart rate and brainwave activity.

The media guidance application may reduce the amount of stimulation for a user. The media guidance application may determine, based on the received biometric data, e.g., heart rate and brainwave activity, that a user is distressed by a war movie currently being displayed, e.g., War Horse; and the media guidance application may send instructions to a user device to request a reduction in the intensity of vibrations and to reduce or disable a scent associated with the movie until the media guide application determines that the data received from the user indicates that the user is back to a non-distressed state. Alternatively, the media guidance system may request and/or receive additional information from the user device that the user has reduced hearing, and based on this information may instruct the user device to increase vibrations or motions of the user device and increase a scent intensity until the user is stimulated at a stimulation level that is a stimulation level intended by the media provider.

The media guidance application may also cause a user to be stimulated. In order to increase the viewing experience of a user, the media guidance application may stimulate the user until the current biometric measurements of the user (e.g., heart rate, body temperature, etc.) correspond to the typical biometric measurements of the user when the user is in the preferred biometric state. For example, for a user watching Jurassic Park, as a T-Rex charges the screen, the media guidance application may stimulate a user until a current biometric measurement of the user (e.g., the heart rate of the user) corresponds to the typical heart rate of the user when he/she is scared. The capabilities of the media guidance application for sensory stimulation may vary based on the sensory information associated with each media asset, media provider, and/or user device. For example, an armchair may be able to provide motion and vibrations, but a helmet may only be able to provide sight, sound and smell. Alternatively, certain media providers may not associate scents with their media assets. Alternatively, a specific media asset may not contain any associated motion information.

The media guidance application may detect that a user has set a preference (e.g., in a user profile) defining a threshold for a biometric state (e.g., a maximum level of distress) or a threshold for a level of sensory stimulation. For example, the media guidance application may detect that a level of distress experienced by the user watching War Horse is about to exceed, or is currently exceeding, the threshold maximum amount of distress. Accordingly, the media guidance application may request the user device, e.g., an armchair, to reduce the intensity of vibrations and to reduce or disable an emission of scents associated with the movie War Horse until the user is back to a non-distressed state. Alternatively, for a user with a user profile indicating a strong risk of heart attacks, the media guidance application may reduce the intensity and frequency of vibrations used to shake the user based on the health condition of the user.

The media guidance application may detect different users and may request and/or generate different sensory stimulation levels for different users while generating for display the same media asset, such that the different users all experience the same preferred biometric state.

As referred to herein, "sensory stimulation" may be the stimulation of any of the five senses (sound, sight, touch, smell, taste). For example, a media guidance application requesting a user device to generate vibrations and emit a whiff of warm air smelling like a dog may be stimulating at least touch and smell. Sensory stimulation levels may be defined by the intensity and frequency of the sensory stimulation. For example, the media guidance application generating "high" vibrations every 15 seconds may be stimulating a user with higher sensory stimulation levels than when the media guidance application generates "medium" vibrations every 60 seconds.

As referred to herein, "biometric state" may be a qualitative and/or quantitative description of a physiological or psychological state. A biometric state may indicate a user's physiological response to levels of sensory stimulation, and reflect the user's psychological state. A user's specific sensibilities and responsiveness to sensory stimulation, i.e., a user's biometric state, may be measured and quantified with biometric measurements. For example, a biometric state may be defined as "fear," "happiness," "anger," "stress," and each emotion may be associated with a set of biometric measurements. For example, the biometric state of "fear" or "happiness" can be described by a combination of quantitative biometric measurements such as heart rate, pupil dilation, body temperature, brain wave activity, etc.

As referred to herein, "biometric measurements" may be any detectable physiological or psychological measurement of a user. A set of biometric measurements associated with a user may define a biometric state. A biometric state may be shared by multiple users (e.g., fear may be reflected by an elevated heart rate for all users), or may be particular to a specific user (e.g., when Jenna experiences fear, her brain activity forms a unique pattern). As referred to herein, "current biometric measurement" may be the instantaneous biometric measurements for a user reflecting the current biometric state for a user.

As referred to herein, a "preferred biometric state" may be a desired biometric state, i.e., a desired physiological response reflecting a particular psychological state. Users may have different sensibilities to the five senses, and may react differently to stimulation of those senses. For example, a user may be much more sensitive to touch than smell. Alternatively, a user (e.g., with tetraplegia) may not be sensitive to touch, but may be hypersensitive to smell. A media provider may have a preferred biometric state for users watching a portion of a media asset.

A media guidance application may generate sensory stimulation at sensory stimulation levels corresponding to a user's specific sensibilities, such that each user experiences the media provider's media asset with its desired biometric state, irrespective of each user's particular sensibilities. As referred to herein, a "threshold amount" may be a maximum or minimum amount of sensory stimulation (e.g., a sound level >90 dB), or a maximum or minimum biometric state (e.g., a significantly high level of fear). The threshold amount may be determined by the media guidance application based on user input, or information acquired from a database or network connection.

A media asset may include, in addition to audio and 2D video, associated information regarding a user's desired biometric state, and/or associated effects in addition to audio and 2D video (e.g., 3D video, smell, touch, taste). As referred to herein, "sensory effects" may be any information generated for display to a user, including sight (including 2D and 3D effects), sound, touch (including vibration and motion), smell and taste.

A media guidance application may recognize different users and auto-configure its stimulation levels to match the preferences or characteristics of a particular user. A multimedia system for multiple end users with each user having private communications with the multi-media system, including feedback for displaying customized media, is described in more detail in McKenna et al. (U.S. Pat. No. 8,308,572), hereby incorporated by reference herein in its entirety.

In some embodiments, a media guidance application may stimulate senses of users by first determining a preferred biometric state associated with a media asset. For example, a "4D" version of Jurassic Park may be associated with an overall desired biometric state of fear. In another example, the "4D" version of Up may be associated with an overall desired biometric state of happiness. Alternatively, a media asset may be associated with different desired biometric states, each corresponding to different passages. For example, a passage of Jurassic Park where the T-Rex is approaching may be associated with an extreme biometric state of fear, and other passages when humans bond with some dinosaurs, or escape the island, may be associated with desired biometric states of happiness and relief.

For the overall biometric state, or for each passage's biometric state if the asset includes multiple biometric states, the media guidance application may cross-reference the preferred biometric state in a database listing biometric measurements of the user that correspond to preferred biometric states. The media guidance application determines a biometric measurement of the user that corresponds to the preferred biometric state.

For example, a first user, John, may experience a significantly elevated heart rate, a significantly increased rate of pupil dilation, and a significantly raised body temperature when he is scared, i.e., when experiencing "fear." For example, the database may indicate that when John is "scared," the body temperature of John is 99 degrees Fahrenheit. In another example, a second user, Lisa, may experience no variation in rate of pupil dilation, and a significantly elevated heart rate. In this example, the database may indicate that when Lisa is "excited" the heart rate for Lisa is 110.

In another example, when the media guidance application cross-references a preferred biometric state of "happiness" for a user, Dana, in a database listing biometric measurements for Dana, the media guidance application may determine that "happiness" for Dana corresponds to biometric measurements such as a slightly elevated heart rate, and specific brainwave patterns.

The media guidance application may determine a current biometric measurement of the user. For example, the media guidance application may acquire information from sensors connected to the user (e.g., John), and may detect John's temperature, pulse, and pupil dilation. Similarly, the media guidance application may determine Dana's current biometric measurements, for example, by measuring her heart rate through sensors placed at her wrists or on her finger, and by collecting brainwave data.

Determining a user's thoughts or feelings and adapting content generated for display based on the user's thoughts or feelings is described in more detail in Klappert et al. (U.S. application Ser. No. 14/038,046), hereby incorporated by reference herein in its entirety.

The recognition and identification of a range of user actions or situations is described in more detail in Frank et al. (U.S. Pat. No. 8,898,091), hereby incorporated by reference herein in its entirety.

The media guidance application may determine a difference in sensory stimulation between a user's current biometric measurement and the biometric measurement of the user that corresponds to the preferred biometric state. For example, the media guidance application system may determine that for David the current sensory stimulation has only resulted in an increase in pupil dilation of 1% compared to his average pupil size, whereas for David to experience a preferred biometric state of "fear," an increase in pupil dilation of 2.5% compared to average is required. For Lana, the media guidance application may determine that the current sensory stimulation, including smells, has resulted in a mild case of asthma, as reflected by Lana's brainwave signature, indicating anxiety associated with the area of her brain detecting smells.

Finally, the media guidance application may request to stimulate a user to account for the difference in sensory stimulation between the user's current biometric measurement and the biometric measurement of the user that corresponds to the preferred biometric state. For example, for John, if sensory stimulation only resulted in a pupil dilation increase of 1%, but the database for John indicates that a desired biometric state of "fear" corresponds to a 3% average pupil size increase for John, the media guidance application may request that the stimulation be increased to obtain the desired pupil dilation of 3%.

Dynamic modification of a system or media content based on user feedback is described in more detail in Baker et al. (U.S. Patent Application Publication No. 2008/0317292), hereby incorporated by reference herein in its entirety.

The media guidance application may also reduce or terminate stimulation to avoid overstimulating a user. For example, the media guidance application may reduce or terminate stimulation through smells until the brain wave signature of a user, e.g., Dana, indicates Dana is no longer experiencing smells. If Dana's brainwaves continue to indicate that Dan is experiencing smells, and/or if other biometric measurements indicate that Dana may be experiencing the onset of an asthma attack, the media guidance application may truncate or interrupt the delivery of a media asset, or generate for display the media asset without any associated sensory stimulations. In an alternative example, if Maggie has unusually good hearing for a 70-80-year-old, the media guidance application may request to lower the intensity and frequency of the sounds associated with the media asset generated for display for Maggie. In parallel, the media guidance application may also update the database for Maggie to more accurately reflect the lower intensity and frequency of sound stimulation required to reach specified biometric states.

In some embodiments, the media guidance application may prompt the user before stimulating the user to account for the difference in sensory stimulations. For example, when the media guidance application determines a difference in sensory stimulation between a user's current biometric measurement and the biometric measurement of the user that corresponds to the preferred biometric state, the media guidance application may request to pause the display of the media asset, and may generate for display a message such as "Would you like to adjust the sensory effects levels for this movie?" The message may include first and second selectable options "Yes" and "No." The media guidance application may apply a default option when the user fails to respond within a certain time period, e.g., 30 seconds.

Alternatively or additionally, before a media asset is displayed, the media guidance application may prompt the user to select whether they want the system to auto-adjust settings to the preferred biometric state while the media asset is displayed. When the media guidance application receives an indication that a user has elected to have the system auto-adjust settings to the preferred biometric state, the media guidance application may also provide the user with an option to exit the auto-adjust mode and revert to standard settings during the course of the media asset. Alternatively, the media guidance application may provide the user with an option to turn off all sensory stimulations during the course of the media asset. For example, Maggie is watching War Horse while baking muffins in her oven. After 30 minutes of watching War Horse Maggie may decide to turn off all or some of the sensory stimulations associated with War Horse (e.g., in particular the smells associated with the media asset) so that she can detect that her muffins are done baking by the smell coming from her kitchen.

In some embodiments, the media guidance application may determine a threshold amount of sensory stimulation for the user, may compare the threshold amount of sensory stimulation for the user to the difference, and not stimulate the user by an amount exceeding the threshold amount of sensory stimulation for the user.

The media guidance application may have predetermined threshold levels. For example, for a six-eight year-old child, the media guidance application may store and implement a preset threshold sound level to avoid damage to children's hearing. Alternatively, the media guidance application may receive threshold levels from user input. For example, Mary may not wish to experience any smells stronger than a 6 on a scale of 1-10. Alternatively, Mary may be concerned about her young child experiencing motions with a range greater than 20 degrees, and may set this as a threshold on the user device (e.g. armchair) motion. In another example, for Dana who has asthma, a threshold amount of sensory stimulation may be anything that results in a distressed state indicating asthma onset. In yet another example, for 70-80 year-olds, the threshold sound level may be much higher than for children, since older users may have difficulty hearing, and may require additional stimulation. Alternatively, for certain categories of users, the media guidance application may disable some sensory stimulations while increasing the remaining sensory stimulations. For example, for people with no sense of smell, the media guidance application may increase the remaining sensory stimulations to compensate for the user not being able to benefit from any stimulation through generated scents or smells.

In some embodiments, the media guidance application requests to stimulate a user by requesting to modify a sound impact level, a touch impact level, a smell impact level, or a sight impact level either by adjusting frequency or intensity. As noted above, the media guidance application may request to adjust sound levels of the media asset, the presence of vibrations or the range of motion of a user device, and the intensity of smells. Additionally, the media guidance application may generate instructions to adjust brightness or contrast of the media asset to control the sight impact level. For example, once the media guidance application has determined an adjustment in sensory stimulation is required and has been implemented by the user device, the media guidance application may check the user's biometric state again and determine again a difference between the user's current biometric state and the preferred biometric state associated with the media asset or the portion of the media asset being currently displayed.

When, after an initial adjustment in sensory stimulation, a user's current biometric state still does not match the preferred biometric state associated with the media asset (either because the user has not been stimulated enough, because the user has become accustomed to the existing stimulation, or because the preferred biometric state has changed), the media guidance application may request a further adjustment in sensory stimulation, and send instructions to the user device. Alternatively, if there is no difference between the user's current biometric state and the preferred biometric state, the media guidance application may simply continue to monitor both the user's current biometric state and the preferred biometric state until a difference is detected.

Controlling a user device such as a chair, based on events or conditions that can include an emotional state of an occupant or external stimuli, is described in more detail in Hamlin et al. (U.S. Patent Application Publication No. 2012/0289312), hereby incorporated by reference herein in its entirety.

In some embodiments, the media guidance application may populate the database listing biometric measurements of the user based on user responses to a biometric calibration. For example, when a user first uses a user device such as a headset or armchair, the media guidance application receives biometric measurements for the user and may prompt the user for feedback. For example, the media guidance application may generate for display a short preview associated with predetermined scent, sound, touch, and sight impact levels, and the media guidance application may then prompt a user to enter his or her overall mood after the preview.

For example, after the media guidance application generates for display a standard preview, the media guidance application may prompt a user, John, to enter (e.g., type in or select from various options) on a user input device his mood as "happy" or "relaxed." Alternatively, the media guidance application may prompt John to enter his level of "fear," which could be 2 out of 10, and his level of "relaxation," which could be 8 out of 10. In contrast, the media guidance application may prompt Jenna, watching the same standard preview, to enter her level of "fear" (e.g., 5 out of 10), or prompt Jenna to type in how she is feeling, e.g. "moderately scared" in a user input field such as a text box.

In addition, the media guidance application may receive and gather biometric measurements from the user device while the user is watching the standard previews. In one example, the media guidance application may generate for display multiple standard previews to a user to obtain user feedback on different user reactions and different user biometric states. The media guidance application may process biometric measurements and user input data, and the media guidance application may create and/or update a database for the user that lists biometric measurements of the user that correspond to different biometric states.

In one example, when a user first uses the media guidance application in "4D" mode, the media guidance application may auto-populate a database with data corresponding to the age group, weight, height, etc., of the user. For example, the media guidance application may initially receive information entered by John indicating that he is 28, weighs 180 pounds, and measures 5'8." The media guidance application may initially receive information from a user entering information into a user profile. For example, John could enter "not easily scared" in his user profile or enter "war movies" as an interest in his user profile. The media guidance application may then automatically populate a database with information corresponding to the age group and other information for John, and the media guidance application may refine the database over time, such that the database becomes more specific to John's biometric measurements. The media guidance application may refine the database through calibration and machine learning to become more specific to the biometric measurements and associated biometric states for each user. Accordingly, over time a database for John will be different than a database for Marc, even if they are in the same age group. Similarly, a database for a 28 year-old male could be different than a database for a 28 year-old female.

In some embodiments, the current biometric measurement includes at least one of heart rate, temperature, blood pressure, and pupil dilation. Biometric measurements may include multiple measurements. The type of biometric measurements and the frequency at which biometric measurements are taken may depend on the media asset, media provider, home entertainment system, or user device. The media guidance application may request and acquire measurements from a user device, for example, an armchair the user is sitting in, or a helmet or headset the user may be wearing.

In some embodiments, the media guidance application stimulates the user to account for the difference in biometric state by adjusting a frequency or intensity of sensory stimuli. For example, the media guidance application may request to disable some sensory stimuli for a particular user or a particular media asset. In another example, the media guidance application may increase in frequency or intensity some but not all of the sensory stimuli. For example, the media guidance application may increase the frequency at which scents are emitted, and request that scents be more pronounced, while requesting that the intensity of touch effects be increased without changing the frequency of the touch effects. Alternatively, the media guidance application may request to combine some stimuli to increase the overall effectiveness of sensory stimulation. For example, combining smell and motion may be more effective than when the smells are released subsequent to the motion taking place. Alternatively, certain stimuli may be more effective when taking place simultaneously.

In some embodiments, a preferred biometric state associated with the media asset is associated with a portion of the media asset currently being consumed by the user. For example, a movie such as Jurassic Park may be associated with more than one preferred biometric state. In this example, different portions or scenes of the movie may be associated with their own preferred biometric states.

One of the operations of the media guidance application is to provide media guidance data to users. As referred to herein, the phrase, "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
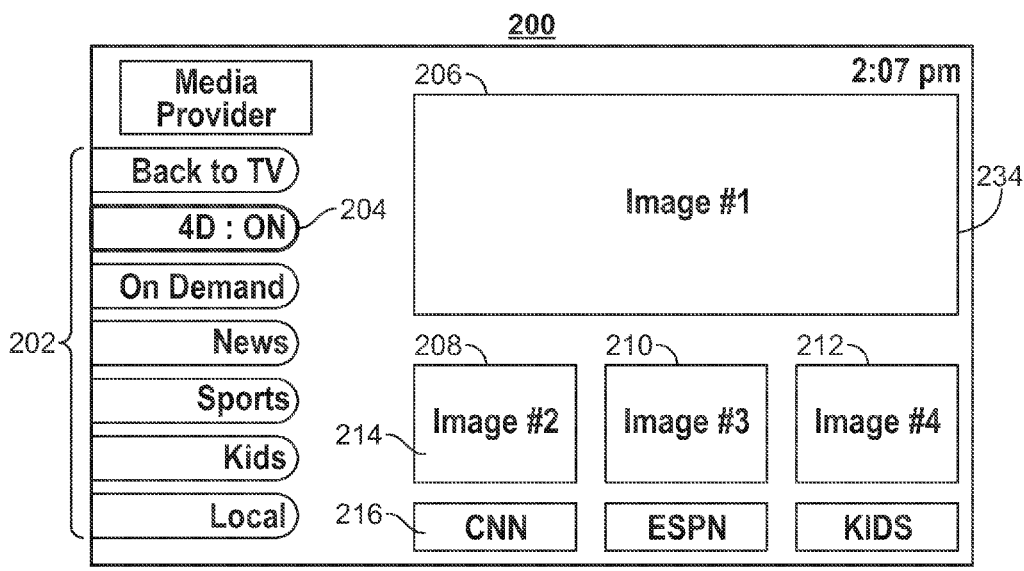
FIG. 2 shows an illustrative media guidance application that may be used to stimulate senses of users in accordance with some embodiments of the disclosure.

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by moving highlight region 110 may be provided in program information region 112. Program information region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In video mosaic display 200, selectable option 204 is selected, thus indicating that the media guidance application is functioning in "4D" mode, i.e., can generate for display media assets in "4D" mode, and providing listings 206, 208, 210, and 212 as broadcast program listings. In video mosaic display 200 listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in video mosaic display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
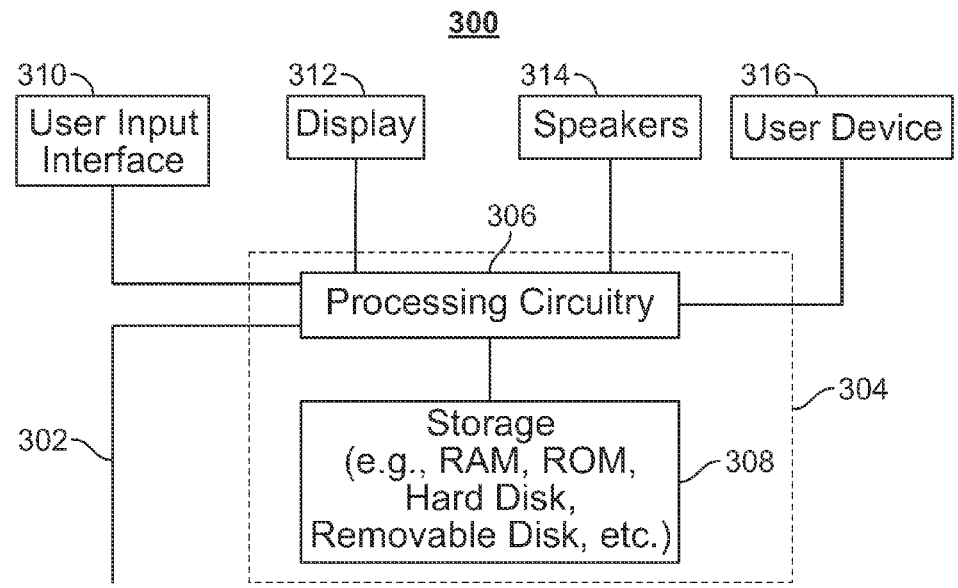
FIG. 3 is a block diagram of an illustrative media system in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. Illustrative user equipment device 300 may receive content and data via input/output (hereinafter "I/O") I/O path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the illustrative user equipment device 300. Control circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from illustrative user equipment device 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of illustrative user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of illustrative user equipment device 300 or may be stand-alone units. The audio component of videos and other content displayed on display 312 may be played through speakers 314. In some embodiments, the audio may be distributed to a receiver (not shown), which processes and outputs the audio via speakers 314.

Control circuitry 304 may also instruct the user component 316 to apply sensory stimulations to the user. For example, the user component 316 may be an armchair, recliner, chair, headset, helmet, glasses, etc., associated with sensors. Control circuitry 304 may instruct the user component 316 to vibrate, rotate, move, blow air, emit scents, etc.

The guidance application may be implemented using any suitable architecture. For example, it may be a stand-alone application wholly implemented on illustrative user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from user input interface 310. For example, movement of a cursor on a display up/down may be indicated by the processed instructions when user input interface 310 indicates that an up/down button was selected.

In some embodiments, the media guidance application is a client-server based application. Data for use by a thick or thin client implemented on illustrative user equipment device 300 is retrieved on-demand by issuing requests to a server remote to the illustrative user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on illustrative user equipment device 300. This way, the processing of the instructions is performed remotely by the server while the resulting displays are provided locally on illustrative user equipment device 300. Illustrative user equipment device 300 may receive inputs from the user via input interface 310 and transmit those inputs to the remote server for processing and generating the corresponding displays. For example, illustrative user equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to illustrative user equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
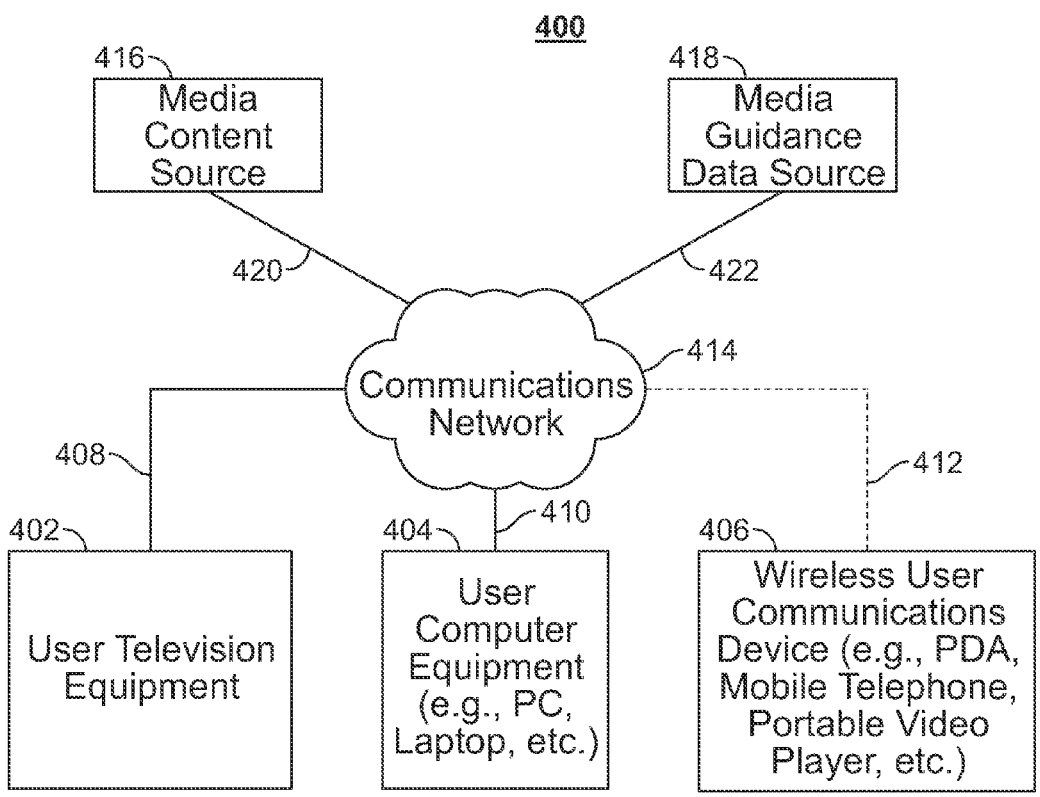
FIG. 4 is a block diagram of an illustrative media system in accordance with some embodiments of the disclosure.

Illustrative user equipment device 300 of FIG. 3 can be implemented in media guidance system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some user television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In media guidance system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

Media guidance system 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between content source 416 and media guidance data source 418 with user equipment devices 402, 404, and 406 are shown as through communications network 414, in some embodiments, content source 416 and media guidance data source 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 308, and executed by control circuitry 304 of an illustrative user equipment device 300. In some embodiments, media guidance applications may be client-server applications where only a client application resides on the user equipment device, and server application resides on a remote server. For example, media guidance applications may be implemented partially as a client application on control circuitry 304 of illustrative user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Figure 5:
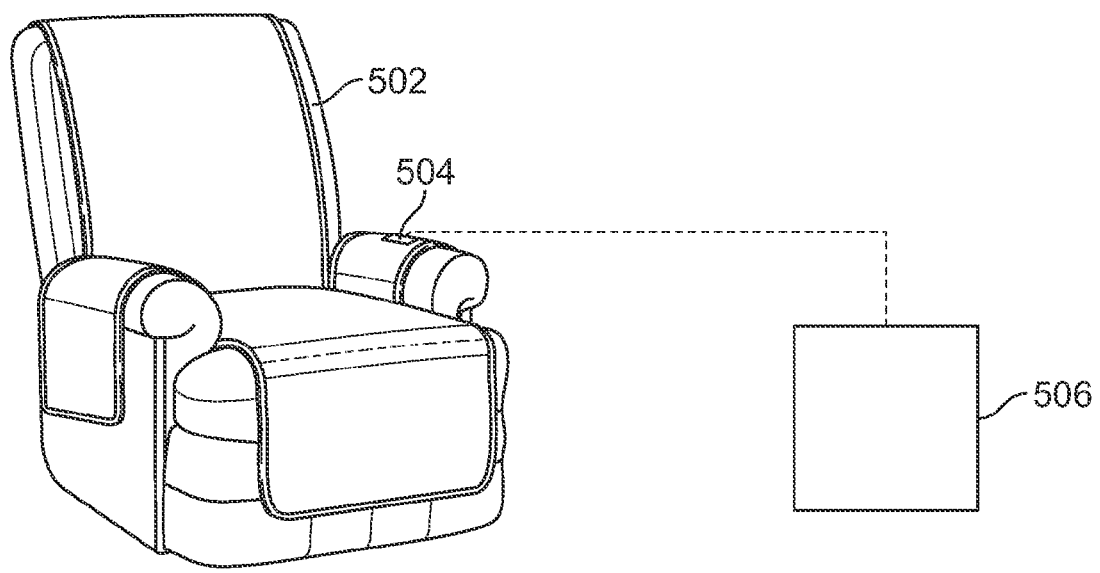
FIG. 5 shows a representation of a user device for determining a biometric state of a user of an illustrative media system in accordance with some embodiments of the disclosure.

FIG. 5 shows a representation of a user device connected to a system implementing a media guidance application, such that the media guidance application may acquire a biometric state of a user in accordance with some embodiments of the disclosure. For example, user device 502 may be an armchair, chair, reclining device, or any device connected to the home entertainment system 506, including sensors 504. In one example, the sensors 504 may be integral to the user device 502. In an alternative example, the sensors 504 may be an add-on kit, which can be installed to any piece of furniture. Sensors 504, and the associated user device 502, may be connected to the home entertainment system 506 and the media guidance application through any means of communication, such as Bluetooth, Wi-Fi, radio waves, or any other suitable means of communication permitting the sending and receiving of data.

Figure 6:
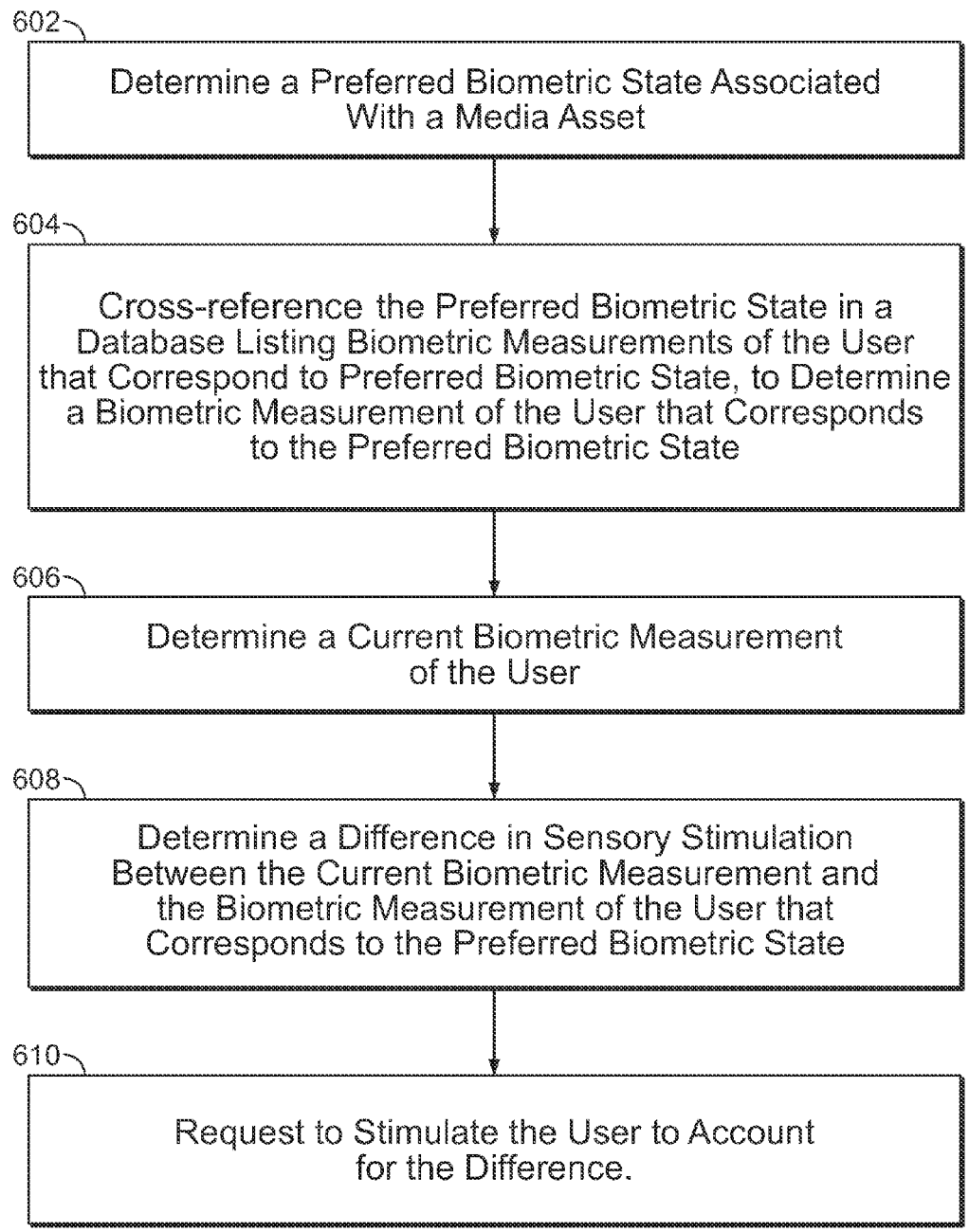
FIG. 6 is a flowchart of illustrative steps involved in stimulating senses of users of a media guidance application, in accordance with some embodiments of the disclosure.

FIG. 6 is a flowchart of illustrative steps involved in stimulating senses of users of a media guidance application, in accordance with some embodiments of the disclosure. For example, a media guidance application implemented on the home entertainment system 506 (FIG. 5) and in communication with a user device 502 (FIG. 5) associated with sensors, e.g., embedded sensors 504 (FIG. 5), may perform the steps illustrated in FIG. 6. It should be noted that process 600, described in FIG. 6, or any step thereof, could be performed on, or provided by, any of the devices shown in FIGS. 3-5. For example, process 600 may be executed by control circuitry 304 (FIG. 3) as instructed by a media guidance application implemented on user device 500 (FIG. 5) in order to stimulate a user. In addition, one or more steps of process 600 may be incorporated into or combined with one or more steps of any other process or embodiment (e.g., process 700 described in FIG. 7).

At step 602, the media guidance application (e.g., implemented on illustrative user equipment device 300 (FIG. 3)) receives, via control circuitry 304 (FIG. 3), instructions to determine a preferred biometric state associated with a media asset. For example, a media guidance application functioning in a "4D" augmented or enhanced reality mode generates for display a "4D" media asset, such as a 4D version of Jurassic Park. The media guidance application generates for display information associated with the 4D version of Jurassic Park which induces a preferred biometric state such as qualitative state of "fear" or "eager anticipation," or a quantitative biometric state of higher-than-average heart rate and pupil dilation, or an 8 out of 10 on a fear scale.

At step 604, the media guidance application (e.g., implemented on illustrative user equipment device 300 (FIG. 3)) cross-references, via control circuitry 304 (FIG. 3), the preferred biometric state in a database (e.g., storage 308 (FIG. 3) and/or any location accessible via communications network 414 (FIG. 4)) listing biometric measurements of the user that correspond to preferred biometric states to determine a biometric measurement of the user that corresponds to the preferred biometric state. For example, each user may initially enter information associated with his or her age group, physical condition or mood, when first connecting to or using the 4D home entertainment system. In an alternative embodiment, the media guidance application accesses, via control circuitry 304 (FIG. 3), the user information from a user profile. The media guidance application uses the user profile information to access or load an initial database (e.g., storage 308 (FIG. 3) and/or any location accessible via communications network 414 (FIG. 4)) corresponding to the user's age group, mood, or any other psychological or physical conditions. The media guidance application further calibrates, via control circuitry 304 (FIG. 3), the database either at set-up, at the request of a user, or at regular intervals (e.g., every two weeks, every ten movies, etc.). The media guidance application performs, via control circuitry 304 (FIG. 3), a database calibration by generating for display a short media asset with associated sensory information to the user and either measuring feedback or prompting the user for feedback. The media guidance application may further progressively update, via control circuitry 304 (FIG. 3), information stored in the database (e.g. storage 308 (FIG. 3) and/or any location accessible via communications network 414 (FIG. 4)) each time the user watches a media asset generated for display by the media guide application.

At step 606, the media guidance application determines, via control circuitry 304 (FIG. 3), a current biometric measurement of the user. The biometric measurements may be associated with the media asset, media provider, home entertainment system, or user. For example, a media guidance application generating for display a media asset associated only with touch sensory stimulation may only acquire heart rate measurements. Similarly, a media guidance application may not need to perform biometric measurements for smells if the media guide application has received instructions from a user to not generate smells.

At step 608, the media guidance application determines, via control circuitry 304 (FIG. 3), a difference in sensory stimulation between the current biometric measurement and the biometric measurement of the user that corresponds to the preferred biometric state. For example, as described above, a user who customarily watches war movies may be indifferent to the average levels of sensory stimulations associated with Saving Private Ryan. Accordingly, higher frequencies and higher levels of intensities may need to be applied to stimulate the user to the level of fear or emotional distress intended by the media provider, and associated with the media asset Saving Private Ryan.

At step 610, the media guidance application requests to stimulate the user, via control circuitry 304 (FIG. 3), to account for the difference in sensory stimulation between the current biometric measurement and the biometric measurement of the user that corresponds to the preferred biometric state. For example, the media guidance application may increase, via control circuitry 304 (FIG. 3), the frequency and intensity of vibrations associated with enemy fire in Saving Private Ryan five-fold for a user not responding to the pre-set sensory stimulation levels in order for that user to reach the preferred biometric state associated with the media asset Saving Private Ryan. In comparison, for a young child watching Saving Private Ryan, the media guidance application may, via control circuitry 304 (FIG. 3), either turn off or reduce the frequency and intensity of vibrations associated with enemy gunfire in Saving Private Ryan, to avoid distressing the user.

Figure 7:
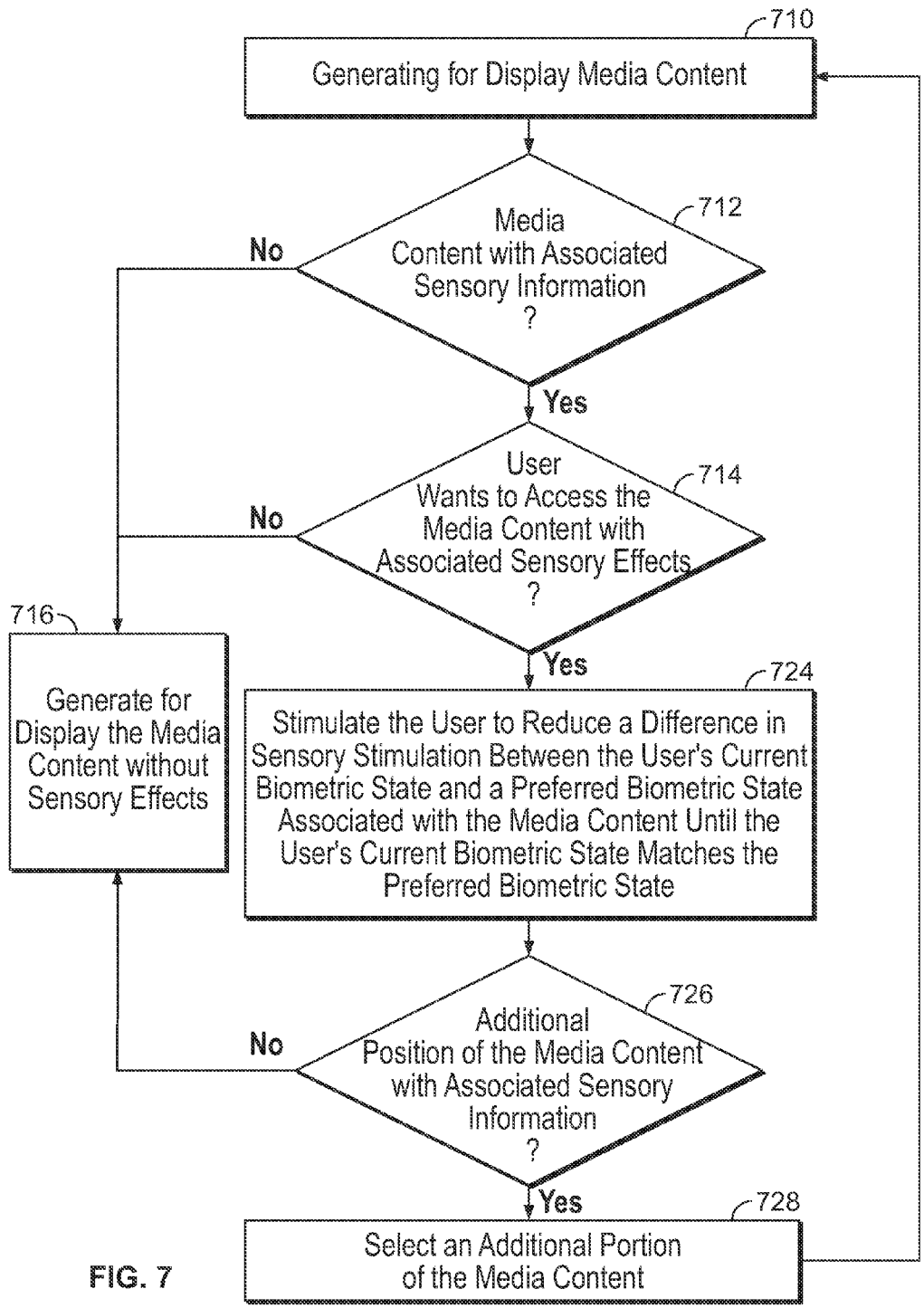
FIG. 7 is a flowchart of illustrative steps involved in performing a media guidance application operation to stimulate senses of users, in accordance with some embodiments of the disclosure.

FIG. 7 is a flowchart of illustrative steps involved in performing a media guidance application operation to stimulate senses of users, in accordance with some embodiments of the disclosure.

It should be noted that process 700 or any step thereof could be performed on, or provided by, any of the devices shown in FIGS. 3-5. For example, process 700 may be executed by control circuitry 304 (FIG. 3) as instructed by a media guidance application implemented on user device 500 (FIG. 5) in order to stimulate a user. In addition, one or more steps of process 700 may be incorporated into or combined with one or more steps of any other process or embodiment (e.g., process 600 (FIG. 6)).

At step 710, the media guidance application (e.g. implemented on illustrative user equipment device 300 (FIG. 3)) generates for display media content. For example, a media guidance application responds to a user selection and, via control circuitry 304 (FIG. 3), generates for display a broadcast program, video-on-demand program, or any audio or video program for which the user selected a program listing.

At step 712, the media guidance application (e.g., implemented on illustrative user equipment device 300 (FIG. 3)) determines, via control circuitry 304 (FIG. 3), whether the media content to be generated for display has associated sensory effects, i.e., no associated sensory information. For example, some media assets may not have a "4D" capability, in which case no sensory information is associated with the media asset. Alternatively, some media assets may have sensory information associated with either the full media asset or portions of the media asset (e.g., certain chapters, or events in the media asset).

At step 714, if the media content does have associated sensory information, the media guidance application (e.g., implemented on illustrative user equipment device 300 (FIG. 3)) determines, via control circuitry 304 (FIG. 3), whether the user wants the media content to be generated for display with the associated sensory effects. For example, a user may be tired and may not want to watch a movie in 4D.

Alternatively, a parent may not want his or her child to watch a war movie in 4D with associated sensory effects and sensory stimulation.

At step 716, if the media content does not have any sensory information associated with it, and/or if the user does not want the media content to be generated for display with associated sensory effects, the media guidance application (e.g., implemented on illustrative user equipment device 300 (FIG. 3)) generates for display, via control circuitry 304 (FIG. 3), the media content without sensory effects. For example, a media content with 4D capabilities may be played in regular "2D" mode without any sensory stimulation beyond that displayed on a standard 2D display device (e.g., sound and sight). If the user does want the media content having associated sensory effects to be generated for display with those sensory effects, the media guidance application (e.g., implemented on illustrative user equipment device 300 (FIG. 3)) continues to step 724.

At step 724, the media guidance application (e.g., implemented on illustrative user equipment device 300 (FIG. 3)) proceeds through steps 602, 604, 606, 608 and 610, as described above in relation to FIG. 6. The media guidance application determines, via control circuitry 304 (FIG. 3), a preferred biometric state associated with the media content, as defined by the media content's sensory information. For example, the media guidance application may determine, via control circuitry 304 (FIG. 3), that a media content has 4D capabilities, and if the user wants to watch the media content with those 4D capabilities, the media guidance application may acquire the sensory information that indicates, e.g., that the user should feel "fear" when watching Chapter 3 of the media asset, but "happiness" when watching Chapter 9 of the media asset.

The media guidance application (e.g., implemented on illustrative user equipment device 300 (FIG. 3)) sets, via control circuitry 304 (FIG. 3), the settings of a user device based on the preferred biometric state associated with the media content. For example, the media guidance application may instruct the user device (e.g., armchair, recliner or glasses) to stimulate the user at some preset average levels, or at some initial levels based on a database (e.g., storage 308 (FIG. 3) and/or any location accessible via communications network 414 (FIG. 4)) for the user listing initial biometric measurements of the user corresponding to preferred biometric states.

The media guidance application determines, via control circuitry 304 (FIG. 3), the user's current biometric measurement, as in step 606. For example, the media guidance application may request and acquire biometric data from the user (e.g., heart rate, pupil dilation rate, temperature, brainwave activity). The media guidance application may process biometric data to determine the user's current biometric state.

The media guidance application (e.g., implemented on illustrative user equipment device 300 (FIG. 3)) cross-references, via control circuitry 304 (FIG. 3), the preferred biometric state in a database (e.g., storage 308 (FIG. 3) and/or any location accessible via communications network 414 (FIG. 4)) which lists biometric measurements of the user that correspond to preferred biometric states to determine a biometric measurement of the user that corresponds to the preferred biometric state associated with the media content being generated for display, as in step 604. For example, in the progressively customized database for a specific user, the state of "fear" defined by the media asset Jurassic Park at Chapter 3 may correspond to an elevated heart rate of 130, but the current biometric state for the user may only be "mild interest" as determined at least by a measured heart rate of 110.

The media guidance application determines, via control circuitry 304 (FIG. 3), whether there is a difference in sensory stimulation between the user's current biometric measurement and the user's biometric measurement that corresponds to the preferred biometric state associated with the media content, as in step 608. For example, in the above-noted example, there may be a difference in the present heart rate (110 beats per minute) and associated biometric state of the user ("mild interest") and the preferred biometric state associated with the media content ("fear") corresponding to a heart rate for this user of 130. If there is no difference in sensory stimulation, the media guidance application simply continues to generate for display, via control circuitry 304 (FIG. 3), the media content and proceeds to step 726.

If a difference in sensory simulation was detected (e.g., at step 608), the media guidance application (e.g., implemented on illustrative user equipment device 300 (FIG. 3)) sends instructions, via control circuitry 304 (FIG. 3), to the user device to modify the user device settings and stimulate the user to account for the previously determined difference in sensory stimulation. For example, the media guidance application may increase, via control circuitry 304 (FIG. 3), the intensity of vibrations or the nature of smells generated. The process may be repeated, with the media guidance application again determining, via control circuitry 304 (FIG. 3), whether there is still a difference in sensory stimulation between the user's current biometric measurement and the user's biometric measurement that corresponds to the preferred biometric state. For example, the media guidance application may determine, via control circuitry 304 (FIG. 3), if the user's heart rate has increased from 110 to 130 as a result of the increased sensory stimulation generated at step 724. This iterative process is repeated until a difference is no longer detected at step 724. For example, if a heart rate for the user has increased to 130, indicating the preferred biometric state of 'fear' has been reached by the user, the method may proceed to step 726. Alternatively, if a heart rate for the user has not yet increased to 130, and only to 120, the media guidance application may need to request further stimulation, via control circuitry 304 (FIG. 3), at step 724 to account for the remaining difference in heart rate and biometric state.

At step 726, the media guidance application (e.g., implemented on illustrative user equipment device 300 (FIG. 3)) determines, via control circuitry 304 (FIG. 3), whether there are additional portions of the media content to be displayed. For example, after processing a scene, chapter, event or portion of a media asset (e.g. the T-Rex approach scene in Jurassic Park, or the introductory love story in Up), the media guidance application may proceed, via control circuitry 304 (FIG. 3), to the following scene, chapter, event or portion of the media asset. Each scene, chapter, event or portion of the media asset may be associated with its own sensory information. In the event that the next chapter, scene, event or portion of the media asset does not contain sensory information, the media guidance application may proceed to check, via control circuitry 304 (FIG. 3), the following chapter, scene, event or portion of the media asset until one is found with associated sensory information, or the end of the media asset is reached. A change in scene may generate a difference between the user's current biometric state and the preferred biometric state associated with a new scene. When there is no upcoming chapter, scene, event or portion of the media asset with associated sensory information, the media content may be generated for display without any sensory effects (step 716).

At step 728, the media guidance application (e.g., implemented on illustrative user equipment device 300 (FIG. 3)) detects, via control circuitry 304 (FIG. 3), an additional portion of the media content, and proceeds back to step 710 to generate for display the media content.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one of more of the steps in FIG. 7.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted, the systems and/or methods described above may be applied to, or used in accordance with, other systems and/or methods.

What is claimed is:

1. A method for stimulating senses of users, the method comprising:
    determining a preferred biometric state associated with a media asset;
    searching a database listing biometric measurements of the user that correspond to preferred biometric states to determine a biometric measurement of the user that corresponds to the preferred biometric state, wherein the determined biometric measurement of the user includes a first plurality of sensor states each having a sensor state value;
    determining a current biometric measurement of the user, wherein the current biometric measurement includes a second plurality of sensor states each having a sensor state value;
    comparing each of the first plurality of sensor state values to a respective one of the second plurality of sensor state values to determine whether any of the second plurality of sensor state values does not correspond to the respective one of the first plurality of sensor state values;
    identifying, based on the comparing, one of the second plurality of sensor state values that does not correspond the respective one of the first plurality of sensor state values to determine a difference in sensory stimulation between the current biometric measurement and the biometric measurement of the user that corresponds to the preferred biometric state;
    in response to identifying the one of the second plurality of sensor state values that does not correspond the respective one of the first plurality of sensor state values, selecting one of the second plurality of sensor states, included in the current biometric measurement, that corresponds to the identified one of the second plurality of sensor state values that does not correspond to the respective one of the first plurality of sensor state values; and
    causing the selected sensor state to be stimulated to account for the difference by changing the sensor state value of the selected sensor state to correspond to the respective one of the first plurality of sensor state values.

2. The method of claim 1, wherein the preferred biometric state is a qualitative description of a physiological or psychological state.

3. The method of claim 1, wherein the biometric measurement is a quantitative description of a physiological state of the user.

4. The method of claim 1, further comprising prompting the user before stimulating the user to account for the difference.

5. The method of claim 1, further comprising:
    determining a threshold amount of sensory stimulation for the user;
    comparing the threshold amount of sensory stimulation for the user to the difference; and
    not causing the user to be stimulated to account for the difference based on the difference exceeding the threshold amount of sensory stimulation for the user.

6. The method of claim 1, wherein stimulating the user to account for the difference comprises modifying a sound impact level, a touch impact level, a smell impact level, or a sight impact level.

7. The method of claim 1, further comprising populating the database listing biometric measurements of the user based on user responses to a biometric calibration.

8. The method of claim 1, wherein the current biometric measurement includes at least one of heart rate, temperature, blood pressure, and pupil dilation.

9. The method of claim 1, wherein stimulating the user to account for the difference includes adjusting a frequency or intensity of sensory stimuli generated by a user device.

10. The method of claim 1, wherein the preferred biometric state associated with the media asset is associated with a portion of the media asset currently being consumed by the user.

11. A system for stimulating senses of users, the system comprising: storage circuitry configured to store a database listing biometric measurements of the user that correspond to preferred biometric states; and
    control circuitry configured to:
        determine a preferred biometric state associated with a media asset;
        search the database listing biometric measurements of the user that correspond to preferred biometric states to determine a biometric measurement of the user that corresponds to the preferred biometric state, wherein the determined biometric measurement of the user includes a first plurality of sensor states each having a sensor state value;
        determine a current biometric measurement of the user, wherein the current biometric measurement includes a second plurality of sensor states each having a sensor state value;
        compare each of the first plurality of sensor state values to a respective one of the second plurality of sensor state values to determine whether any of the second plurality of sensor state values does not correspond to the respective one of the first plurality of sensor state values;

identify, based on the comparing, one of the second plurality of sensor state values that does not correspond the respective one of the first plurality of sensor state values to determine a difference in sensory stimulation between the current biometric measurement and the biometric measurement of the user that corresponds to the preferred biometric state;

in response to identifying the one of the second plurality of sensor state values that does not correspond the respective one of the first plurality of sensor state values, select one of the second plurality of sensor states, included in the current biometric measurement, that corresponds to the identified one of the second plurality of sensor state values that does not correspond to the respective one of the first plurality of sensor state values; and cause the selected sensor state to be stimulated to account for the difference by changing the sensor state value of the selected sensor state to correspond to the respective one of the first plurality of sensor state values.

12. The system of claim 11, wherein the preferred biometric state is a qualitative description of a physiological or psychological state.

13. The system of claim 11, wherein the biometric measurement is a quantitative description of a physiological state of the user.

14. The system of claim 11, wherein the control circuitry is further configured to: prompt the user before stimulating the user to account for the difference.

15. The system of claim 11, wherein the control circuitry is further configured to:
determine a threshold amount of sensory stimulation for the user;
compare the threshold amount of sensory stimulation for the user to the difference; and
not cause the user to be stimulated to account for the difference based on the difference exceeding the threshold amount of sensory stimulation for the user.

16. The system of claim 11, wherein stimulating the user to account for the difference comprises modifying a sound impact level, a touch impact level, a smell impact level, or a sight impact level.

17. The system of claim 11, wherein the control circuitry is further configured to:
populate the database listing biometric measurements of the user based on user responses to a biometric calibration.

18. The system of claim 11, wherein the current biometric measurement includes at least one of heart rate, temperature, blood pressure, and pupil dilation.

19. The system of claim 11, wherein stimulating the user to account for the difference includes adjusting a frequency or intensity of sensory stimuli generated by a user device.

20. The system of claim 11, wherein the preferred biometric state associated with the media asset is associated with a portion of the media asset currently being consumed by the user.

* * * * *